United States Patent [19]

Ohno

[11] Patent Number: 4,465,650
[45] Date of Patent: Aug. 14, 1984

[54] PROCESS FOR PREPARING NITRIDED SUPERHARD COMPOSITE MATERIALS

[75] Inventor: John M. Ohno, Plymouth, Mich.

[73] Assignee: General Electric Company, Detroit, Mich.

[21] Appl. No.: 331,374

[22] Filed: Dec. 16, 1981

[51] Int. Cl.³ .............................................. C04B 33/34
[52] U.S. Cl. ...................................... 264/60; 51/293; 51/307; 264/63; 264/82
[58] Field of Search ......................... 51/293, 307, 309; 264/60, 63, 65, 82

[56] References Cited

U.S. PATENT DOCUMENTS

| | | | |
|---|---|---|---|
| 4,171,339 | 10/1979 | Lee et al. | 264/332 |
| 4,173,614 | 11/1979 | Lee et al. | 264/332 |
| 4,235,857 | 11/1980 | Mangels | 423/344 |
| 4,241,135 | 12/1980 | Lee et al. | 51/309 |
| 4,242,106 | 12/1980 | Morelock | 51/307 |
| 4,247,304 | 1/1981 | Morelock | 51/295 |

FOREIGN PATENT DOCUMENTS 12966 9/1980 European Pat. Off. .
2006733 5/1979 United Kingdom .

Primary Examiner—Donald E. Czaja
Assistant Examiner—W. Thompson
Attorney, Agent, or Firm—Hedman, Gibson, Costigan & Hoare

[57] ABSTRACT

A cutting insert having a cutting portion comprising a dispersion of diamond crystals in a matrix of β-silicon carbide and silicon nitride is produced by forming a first dispersion of diamond crystals evenly coated with carbon black in a temporary binder, and forming a second dispersion of carbon fiber, carbon black and filler in a temporary binder. The first and second dispersions are compacted together to produce an intermediate composite which is heated in a vacuum furnace in order to remove the temporary binder and allow liquefied silicon to infiltrate the composite. The composite is then sintered and subjected to nitrogen, wherein elemental silicon at the surface of the composite reacts with the nitrogen to produce silicon nitride.

9 Claims, 10 Drawing Figures

PROCESS FOR PREPARING NITRIDED SUPERHARD COMPOSITE MATERIALS

BACKGROUND OF THE INVENTION

Cutting inserts containing superhard crystals, such as diamond, cubic boron nitride, $\alpha$ $Si_3N_4$ or $\beta$ $Si_3N_4$, exhibit excellent wear-resistance characteristics.

An increasing number of techniques have been developed for employing $\alpha$ or $\beta$ $Si_3N_4$ in such cutting inserts. Representative of such techniques are those disclosed in U.S. Pat. Nos. 4,264,548; 4,264,550; and 4,280,973. None of these techniques relate to cutting inserts including a dispersion of diamond crystals.

However, high speed machining of Al-Si alloys requires the use of diamond crystals in cutting inserts, since Al-Si alloys, particularly alloy 390, is very abrasive.

Recently, an economical and rapid technique for forming cutting inserts having a high concentration of diamond crystals at the cutting edges, has been devised, and is described in U.S. patent application Ser. Nos. 167,019 and 167,196, by Dr. John M. Ohno, both filed July 9, 1980, and assigned to the assignee of the present invention, now abandoned, and in their respective co-pending continuation application Ser. Nos. 313,241, now U.S. Pat. No. 4,428,755 and 312,987, now U.S. Pat. No. 4,417,906, filed Oct. 20, 1981, the entire disclosures of which are hereby incorporated by reference. Disclosed therein is a straightforward technique (hereinafter referred to as the "press and treat" technique) for economicaly and rapidly forming a composite body for use as a cutting insert. Very briefly, the press and treat technique involves the preparation of a first or a crystal dispersion of super-hard crystals such as diamond or cubic boron nitride crystals in carbon black and a second or core dispersion of carbon black, carbon fiber and filler material such as $\beta$ or $\alpha$-silicon carbide. The two dispersions are individually mixed with a small amount of temporary binder, such as paraffin, to lend a sufficient green strength to the two dispersions upon cold compaction thereof. After compacting the two dispersions together in a desired configuration, the compact is vacuum heated in the presence of silicon to burn off the paraffin and to allow the silicon to infiltrate both dispersions. Upon further heating, and without the need for the constant application of any type of pressure to the insert, the silicon reacts with the carbon black to form a $\beta$-silicon carbide and silicon matrix which bonds both dispersions both internally and to each other.

In general, the machining of Al-Si alloy, particularly alloy 390, is extremely difficult, not only due to the highly abrasive nature of the alloy, but also due to the typically rough and interrupted cutting encountered with Al-Si 390 castings, which typically include a number of ingate and inclusions on the machined surface. Typical operating requirements when machining alloy 390 are given below in Table I for finish machining and in Table II for rough machining.

TABLE I

| SPEED | DEPTH OF CUT | FEED/REV. |
|---|---|---|
| 3000-2000 SFPM | 0.02-0.05" | .0025-.0027" |

TABLE II

| SPEED | DEPTH OF CUT | FEED/REV. | OPERATION |
|---|---|---|---|
| 1200 SFPM | .075" | .0100" | O.D. Turning |
| 1400 SFPM | .060-.080" | .0101" | Facing |

In order to cope with rough machining conditions, several changes to the basic cutting insert as disclosed in the above-mentioned co-pending patent applications are desirable. One such modification is to provide a cutting insert used for the rough machining of Al-Si alloy with a bi-level top surface to reduce the bending moment imparted to the insert during the machining operation, as disclosed in co-pending U.S. patent application Ser. No. 331,365, filed concurrently herewith, by Dr. John M. Ohno and assigned to the assignee of the present invention, the entire disclosure of which is hereby incorporated by reference.

Another technique for coping with the rough machining operation is to produce a cutting insert composite having a particular configuration which employs a prepressed centerpiece or pellet, as described in co-pending U.S. patent application Ser. Nos. 331,370 and 331,376, filed concurrently herewith, by Dr. John M. Ohno and assigned to the assignee of the present invention, the entire disclosures of which are hereby incorporated by reference.

Although the above-mentioned techniques improve the capabilities of the cutting inserts to provide rough machining of Al-Si alloy, buildup of the Al-Si alloy, although significantly reduced compared to prior art inserts, still exists.

More specifically, in producing such inserts, it is necessary to provide free silicon in excess of that required to react with the carbon black in the composite to form $\beta$-silicon carbide, since the lack of such free silicon in the composite may contribute to voids in the micro structure as illustrated in FIG. 1. Thus, during the step of silicon infiltration, silicon in excess of that required for reaction with carbon black is provided to thereby fill the voids, the composite being bound by a matrix of $\beta$-silicon carbide and silicon. The complete infiltration of elemental silicon, including the excess free silicon discussed above, produces a composite having substantially no voids, as illustrated in FIG. 2. A specific example of the composite produced in accordance with the press and treat technique having an excess of elemental silicon is described in Table III prior to silicon infiltration and in Table IV after silicon infiltration.

TABLE III

| | DIAMOND | CARBON BLACK | PARAFFIN | |
|---|---|---|---|---|
| Cutting Edges | 92-93 | 2-3 | 5 | |
| | SiC CRYSTAL | C.B. + C. FIBER | PARAFFIN | BORON |
| Main Body | 75-79 | 13-18 | 5 | 1-1.5 |

TABLE IV

| | FREE Si | |
|---|---|---|
| | BY WEIGHT (%) | BY VOLUME |
| Cutting Edges | 7-10 | 10-13 |

TABLE IV-continued

| | FREE Si | |
|---|---|---|
| | BY WEIGHT (%) | BY VOLUME |
| Main Body | 14–17 | 18–21 |

The elemental silicon on the surface of the composite reacts with the Al-Si work material causing a slight buildup of the Al-Si alloy on the cutting edge.

FIG. 3 illustrates a tungsten carbide insert containing 6% cobalt after machining an Al-Si (16–18%) alloy for only two minutes. The adhesion of the Al-Si material to the insert due to the reaction of Al-Si and Co is highly detrimental to the cutting insert.

FIG. 4 illustrates Al-Si buildup on an $Al_2O_3$ coated tungsten carbide insert after machining the same Al-Si alloy for only five minutes. Again, the effects of the metal buildup are readily evident.

FIGS. 5a and 5b illustrate an indexable diamond composite insert containing approximately 10% elemental silicon produced in accordance with the press and treat technique, after machining the same Al-Si alloy for four hours and thirty minutes. The dramatic improvements in wear and metal adhesion are readily apparent using such insert, but a further reduction in the adhesion of the Al-Si alloy to the insert is desired and would be of great benefit, since such buildup may shorten the life of the insert and reduce the quality of the surface finish.

SUMMARY OF THE INVENTION

It is therefore an object of the present invention to provide a cutting insert exhibiting a reduced adhesion of the Al-Si material thereto.

It is a further object of the present invention to provide an additional step in the press and treat process for providing a surface composition on a cutting insert which reduces the adhesion of Al-Si alloy thereto.

It is a further object of the present invention to provide a nitriding treatment for a cutting insert composite produced in acordance with the press and treat technique which results in a cutting insert exhibiting re-. duced adhesion of Al-Si alloy thereto.

In accordance with a first aspect of the invention, a process for preparing a nitrided composite includes the steps of forming a first dispersion of diamond crystals evenly coated with carbon black in a temporary binder and forming a second dispersion of carbon fiber, carbon black and filler in temporary binder. The first and second dispersions are compacted together to form an intermediate composite which is heated in a furnace in a substantial vacuum in order to remove substantially all of the temporary binder. Liquefied silicon is allowed to infiltrate the intermediate composite, and the infiltrated intermediate composite is then sintered to produce a $\beta$-silicon carbide and silicon binder uniting the intermediate composite. The sintered composite is then subjected to nitrogen, the elemental silicon reacting with the nitrogen to produce $Si_3N_4$ at the surface of the sintered composite.

In accordance with specific embodiments, the sintered composite may be subjected to the nitrogen for approximately sixty minutes at approximately 1400°–1100° C., or may be subjected to the nitrogen for at least approximately thirty minutes at approximately 1410°–1100° C. The above process may further include the step of flashing a mixture of hydrogen and nitrogen into the furnace prior to the step of subjecting the sintered composite to nitrogen.

In accordance with a second aspect of the invention, a cutting insert is provided with a cutting portion which comprises a dispersion of diamond crystals in a matrix of $\beta$-silicon carbide, $Si_3N_4$ and much less Si.

In accordance with a third aspect of the invention, a polygonal cutting insert is provided with a plurality of cutting portions at the corners thereof and a core centrally disposed between the cutting surfaces. The plurality of cutting portions have surfaces which are elevated relative to the core, the cutting portions including a dispersion of diamond crystals in a matrix of $\beta$-silicon carbide, $Si_3N_4$ and much less Si.

In accordance with a specific embodiment of the third aspect of the invention, the cutting portions may be connected by a thin layer of the dispersion of diamond crystals in the matrix of $\beta$-silicon carbide, $Si_3N_4$ and much less Si on top of the core, the cutting portions extending deeper into the core than the thin layer, and the surfaces of the cutting portions being elevated relative to the thin layer. Additionally, specific percentage weights of the various components in the cutting portions described above are disclosed.

BRIEF DESCRIPTION OF THE DRAWINGS

These and other objects, aspects and embodiments of the present invention will be described in more detail with reference to the following drawing figures of which:

FIG. 5a is a photograph of a diamond composite insert produced in accordance with the press and treat technique containing approximately 10% elemental silicon, after machining the same Al-Si alloy for four hours and thirty minutes;

FIG. 5b is a side view of the insert illustrated in FIG. 5a;

DETAILED DESCRIPTION OF THE PREFERRED EMBODIMENTS

In accordance with the present invention, an insert produced by the press and treat technique is further treated with nitrogen to produce amorphous silicon nitride at the surface of the insert. The silicon nitride further densifies the insert and since it has no reaction with aluminum even 1000° C., Al-Si alloy will not adhere thereto.

Figure 6:
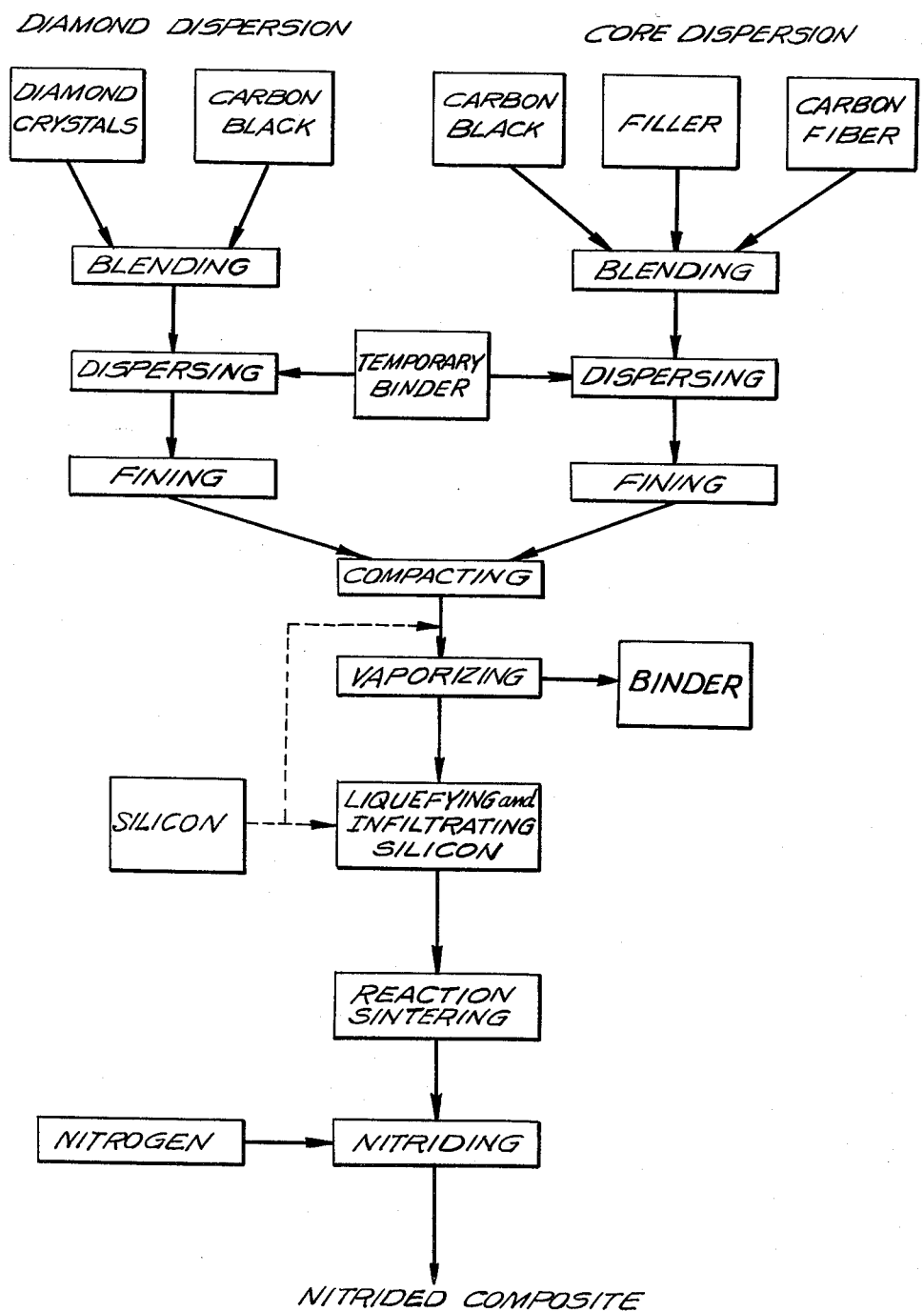
FIG. 6 is a flow chart illustrating the process for producing the nitrided diamond composite insert in accordance with the present invention.

FIG. 6 illustrates the essential steps included in the press and treat technique as essentially set forth in copending U.S. patent application Ser. No. 312,987. Specifically, a dispersion of diamond crystals in carbon black, and a dispersion of carbon fiber and filler in carbon black are each blended and mixed with a small amount of temporary binder such as paraffin. Upon further fining of the dispersions, the dispersions are compacted together in the desired configuration and the compacted structure is vacuum heated in order to burn off the binder. Concurrently therewith, or shortly after, elemental silicon is applied to the composite in the vacuum oven. The silicon liquefies and infiltrates through pores in the composite provided by the removal of the binder. The penetration of the molten silicon occurs well above the melting point of 1410° for silicon. The reaction between the elemental carbon and molten silicon begins slowly but becomes more active as the temperature is raised to about 1490° C. Diffusion through carbon films along the crystal boundaries and carbon fiber takes place during this time which preferrably lasts approximately 30–60 minutes.

Reaction along the crystal boundaries causes an opening in the porous structure due to the volumetric increase which occurs during the formation of silicon carbide from the elemental carbon and silicon, as shown in Equations 1 through 3 below:

$$(Vm)_{Si} = \frac{28.086 \text{ g/mole}}{2.33 \text{ g/cc}} = 12.05 \text{ cc/mole Si} \quad (1)$$

$$(Vm)_{SiC} = \frac{40.097}{2.85} = 14.069 \text{ cc/mole SiC} \quad (2)$$

$$\frac{\Delta Vm}{(Vm)_{Si}} = \frac{2.019}{12.05} = 0.17 \text{ (17\% Increase in Volume)} \quad (3)$$

Figure 1:
FIG. 1 is a photograph illustrating the composite produced in accordance with the press and treat technique wherein an excess of elemental silicon is not provided during silicon infiltration, the insert being magnified approximately one thousand times.

The porous structure is illustrated in FIG. 1, discussed above.

Figure 2:
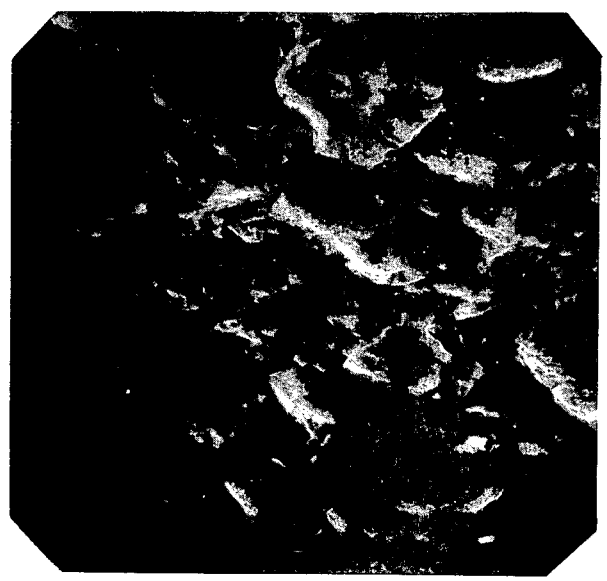
FIG. 2 is a photograph illustrating the composite produced in accordance with the press and treat technique wherein the composite is provided with excess elemental silicon during the infiltration thereof, the insert being magnified approximately one thousand times.
Figure 3:
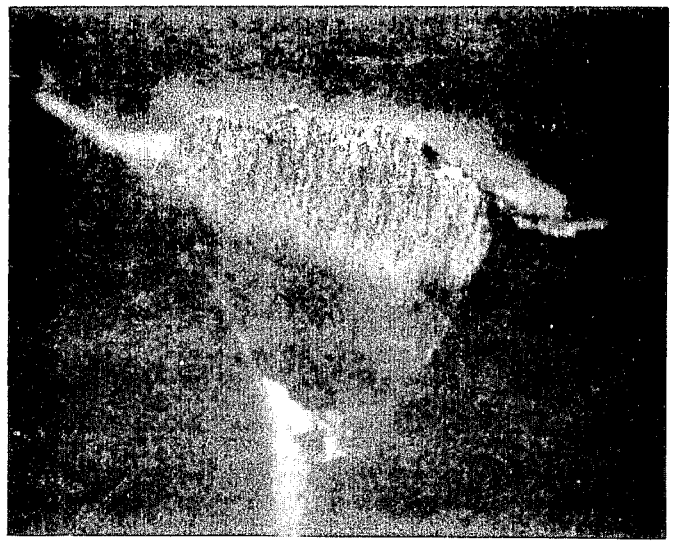
FIG. 3 is a photograph of metal buildup on a popular tungsten carbide cutting insert containing 6% cobalt after machining an Al-Si alloy for two minutes.
Figure 4:
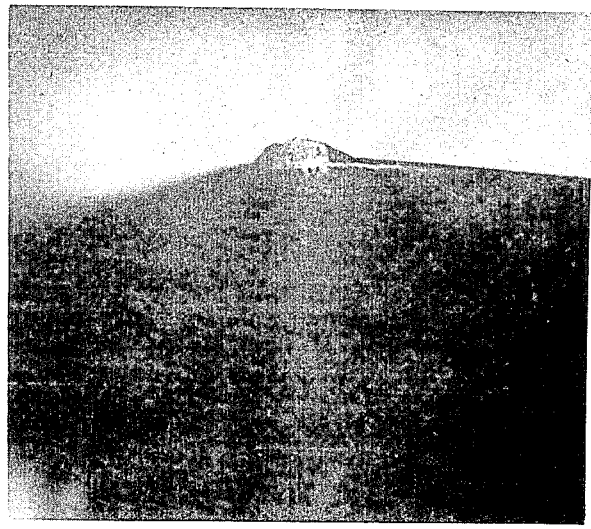
FIG. 4 is a photograph illustrating buildup of Al-Si alloy on an $Al_2O_3$ coated tungsten carbide insert after machining the same Al-Si alloy for five minutes.
Figures 5A, 5B:

The free silicon is allowed to further penetrate through the open pores during the holding time at approximately 1490° C. and the diffusion and reaction may continue until all of the carbon is consumed and the composite is saturated with free silicon and the reaction product (β-silicon carbide) along the crystal boundaries to thereby serve as the binding phase for the crystals. Upon such further silicon infiltration, the composite attains the appearance generally illustrated in FIG. 2, also discussed above.

Up to this point, the process described is essentially the same as that disclosed in the above-mentioned pending patent applications, namely the press and treat technique. However, in accordance with a first example of the present invention, nitrogen may now begin to flow into the vacuum furnace after the reaction of carbon with infiltrated Si, at a temperature of approximately 1350° C. to 1100° C. for approximately forty-five minutes, at which time the nitriding of the surface takes place, the nitrogen reacting with the silicon to produce amorphous $Si_3N_4$. Prior to the nitriding step, hydrogen may be flashed into the furnace at a temperature of 1490° C. to 1350° C. to thereby reduce any oxygen contained therein, if so desired.

In accordance with a second example of the present invention, after the approximately forty-five minute holding period required for silicon infiltration and reaction at approximately 1490° C., a flash of $H_2$ and $N_2$ is provided to reduce the furnace environment. Nitrogen is then allowed to flow at 1410°–1100° C. for thirty minutes or longer.

After the step of nitriding, the composite is cooled in the furnace. As the temperature decreases, the penetration of nitrogen takes place very slowly through pores. The penetration of the nitrogen densifies the structure until clogging completely prevents the flow of nitrogen. The clogging of the pores is a result of a volumetric increase in the surface of the composite caused by the reaction between the free silicon and the nitrogen atmosphere in the furnace, as described, by Equations 4 through 8, below:

$$(Vm)_{Si} = \frac{28.086 \text{ g/mole}}{2.33 \text{ g/cc}} = 12.05 \text{ cc/mole Si} \quad (4)$$

$$(Vm)_{Si_3N_4} = \frac{140.105 \text{ g/mole}}{3.18 \text{ g/cc}} = 44.08 \text{ cc/mole } Si_3N_4 \quad (5)$$

$$\frac{Si_3N_4}{\text{Mole Si}} = \frac{44.08 \text{ cc}}{3 \text{ moles}} = 14.69 \text{ cc/mole } (Si_3N_4/\text{mole Si}) \quad (6)$$

$$\Delta Vm = 14.69 - 12.05 = 2.64 \text{ cc/mole Si} \quad (7)$$

$$\frac{\Delta Vm}{(Vm) \text{ Si}} = \frac{2.64}{12.05} = 0.22 \text{ (22\% Increase)} \quad (8)$$

The depth of the reaction layer depends on the temperature and reaction time. However, the diffusion of nitrogen is negligible after the clogging described above. Additionally, since the temperature is decreased after such clogging, further reaction will not take place thus insuring that the nitriding is a surface treatment only.

Conventional reaction of $Si_3N_4$ at a temperature far above the melting point of silicon produces crystalline $Si_3N_4$, the grain of which is coarser than that of amorphous $Si_3N_4$. Additionally, the pure crystalline $Si_3N_4$ is very difficult to sinter as illustrated in the above-mentioned patents.

Figure 7:
FIG. 7 is a photograph illustrating the surface of the nitrided diamond composite insert produced in accordance with the technique illustrated in FIG. 6, the insert being magnified approximately two hundred times.

FIG. 7 illustrates an unground cutting edge of the nitrided composite containing diamond, β-silicon carbide and amorphous $Si_3N_4$, the amount of free silicon being rendered to an almost negligible amount. Such composite has been tested on Al-Si alloy at a speed of 1400 SFPM, a feed per revolution of 0.008 inches, and a depth of cut of 0.020 inches with a coolant. The problem of metal adhesion to the cutting edge was completely eliminated.

Formation of $Si_3N_4$ crystals requires a gaseous mixture such as $SiCl_4$, $SiH_4$, ammonia and methane, as described in U.S. Pat. Nos. 4,235,857 and 4,280,989, for example.

Rather, the present invention merely requires the injection of nitrogen gas into the furnace and is therefore straightforward, inexpensive, readily lends itself to automated procedures, and is essentially pollution free. Further, neither high temperature nor high pressure techniques are employed as in the prior art, thus producing amorphous $Si_3N_4$, rather than conventional α or β $Si_3N_4$. Although the hardness of amorphous $Si_3N_4$ is lower than that of α or β $Si_3N_4$, it has the advantage of providing a protective layer which both eliminates buildup of Al-Si alloy, a further densification of the surface of the insert, a hardening of the binder phase, a 20 to 40% increase in the bending strength of the insert and an increased wear-resistance.

Table V, below, illustrates one example of the relative percentage weights of the constituent components of the insert produced in accordance with the present invention, both before and after nitriding.

TABLE V

|  | DIAMOND | β SiC | FREE Si | $Si_3N_4$ |
|---|---|---|---|---|
| Before nitriding | 83–84 | 4–6 | 9–10 |  |
| After nitriding | 81–82 | 3–5 | 3–4 | 5–10 |

Tables VI and VII illustrate further examples of composites produced according to the teachings herein, with the additional provision of a small amount of boron in the main body.

TABLE VI

| WEIGHT % | DIAMOND | β SiC | FREE Si | $Si_3N_4$ | BORON |
|---|---|---|---|---|---|
| Capped Area | 79–82 | 4–6 | 4–6 | 8–10 |  |
| Main Body | Filler (SiC) 46–50 | 25–29 | 6–8 | 14–16 | 0.7–0.9 |

TABLE VII

| WEIGHT % | DIAMOND | β SiC | FREE Si | $Si_3N_4$ | BORON |
|---|---|---|---|---|---|
| Capped Area | 79–82 | 4–6 | 5–8 | 4–7 |  |
| Main Body | Filler (SiC) 44–49 | 29–33 | 10–12 | 8–10 | 0.7–0.9 |

The intermediate composite used in accordance with the present invention may be produced in accordance with the technique disclosed in co-pending U.S. patent application Ser. No. 331,376, the insert in accordance with the present invention being readily adaptable to a number of different configurations, such as those described with reference to the co-pending patent applications.

Figure 8A:
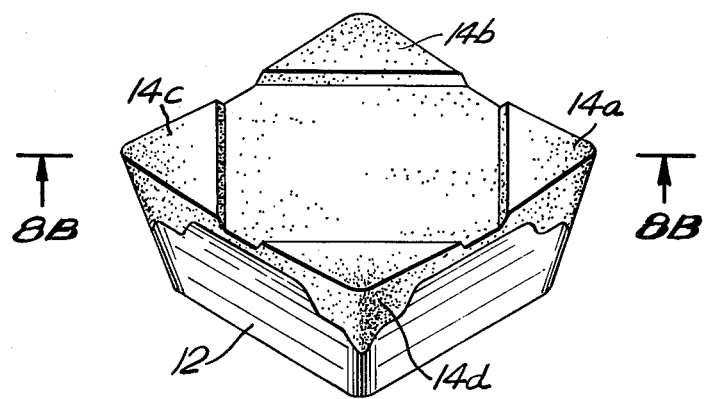
FIG. 8a is a perspective view of a nitrided insert produced in accordance with a preferred embodiment of the present invention.
Figure 8B:
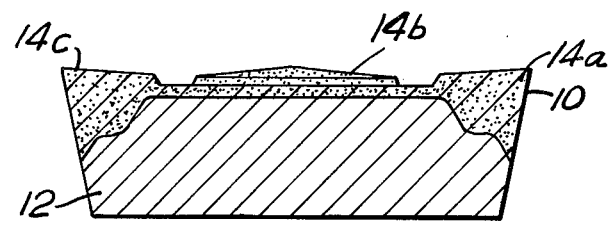
FIG. 8b is a cross-section view of the FIG. 8a insert taken through section 8B—8B.

One possible configuration for the nitrided insert of the present invention is shown in FIGS. 8A and 8B. The insert is of generally square configuration and has a diamond dispersion layer 10 and an underlying core layer 12. Diamond dispersion layer 10 extends over the entire surface of the core but extends more deeply into the core at the corners 14a–14d of the insert. Additionally, the surface of the top layer at the corners of the insert is elevated vertically above the central portion of the top layer such that only the corner portions of the insert make contact with the tool holder, as more fully described in co-pending patent application Ser. No. 331,365 filed Dec. 16, 1981.

The nitriding treatment in accordance with the present invention does not require any additional equipment over that already required for the press and treat technique, since it is a sequential step employing the same furnace as that heretofore employed. Since the densified and nitrided composite can be made without hot press technology, it is much less expensive and can be more rapidly made. Additionally, the nitrogen reacts only with the elemental silicon in the composite, having no effect on the other components. Unlike the prior art sintering processes for producing high density $Si_3N_4$ containing products, the densification through the use of $Si_3N_4$ in accordance with the present invention is achieved without the use of additives such as MgO, CaO, $Al_2O_3$, $SiO_2$, $Y_2O_3$, $MnO_2$, $LiO_2$, AlN, VN, etc.

The above-mentioned patents, patent applications and/or publications are incorporated herein by reference. Other modifications and variations of the present invention are possible, in the light of the above teachings. It is therefore, to be understood that changes may be made in the particular embodiments of the invention described which are within the full intended scope of the invention as defined by the appended claims.

What is claimed is:

1. A process for preparing a surface nitrided composite comprising:
   (a) forming a first dispersion of diamond crystals evenly coated with carbon black in a temporary binder;
   (b) forming a second dispersion of carbon fiber, carbon and filler a temporary binder;
   (c) compacting said first and second dispersions together to produce an intermediate composite;
   (d) placing the intermediate composite in direct contact with silicon and heating said intermediate composite in a furnace in a substantial vacuum in order to remove substantially all of said temporary binder;
   (e) allowing liquefied silicon to infiltrate said intermediate composite;
   (f) sintering the intermediate composite and infiltrated silicon to thereby produce a β-silicon carbide and elemental silicon binder uniting said intermediate composite; and
   (g) subjecting the sintered composite to nitrogen whereby said elemental silicon reacts with said nitrogen to produce $Si_3N_4$ at the surface of said sintered composite.

2. The process of claim 1 wherein said sintered composite is subjected to said nitrogen for approximately sixty minutes at approximately 1410°–1100° C.

3. The process of claim 1 or 2 further comprising the step of flashing a mixture of $H_2$ and $N_2$ into said furnace prior to said step of subjecting said sintered composite to nitrogen.

4. The nitrided composite provided in accordance with the process of claim 1 or 2.

5. The nitrided composite produced in accordance with the process of claim 3.

6. A cutting insert having a cutting portion comprising a dispersion of diamond crystals in a matrix including β-silicon carbide and $Si_3N_4$.

7. A polygonal cutting insert having a plurality of cutting portions located at the corners thereof and a core centrally disposed between said cutting surfaces, said plurality of cutting portions having surfaces elevated relative to said core, said cutting portions including a dispersion of diamond crystals in a matrix including β-silicon carbide and $Si_3N_4$.

8. The cutting insert of claim 7 wherein said cutting portions are connected by a thin layer of said dispersion of diamond crystals in said matrix of β-silicon carbide and $Si_3N_4$ on top of said core, said cutting portions extending deeper into said core than said thin layer and said surfaces of said cutting portions being elevated relative to said thin layer.

9. The process according to claim 1, wherein the action of placing the intermediate composite in direct contact with silicon occurs shortly after the binder material is removed.

* * * * *